United States Patent [19]
Cox et al.

[11] Patent Number: 4,504,737
[45] Date of Patent: Mar. 12, 1985

[54] TRITIUM MONITOR WITH IMPROVED GAMMA-RAY DISCRIMINATION

[75] Inventors: Samson A. Cox; Edgar F. Bennett, both of Downers Grove; Thomas J. Yule, West Chicago, all of Ill.

[73] Assignee: The United States of America as represented by the United States Department of Energy, Washington, D.C.

[21] Appl. No.: 435,795

[22] Filed: Oct. 21, 1982

[51] Int. Cl.³ .................... G01N 21/00; G01N 23/00
[52] U.S. Cl. ................................. 250/435; 250/432 R
[58] Field of Search ............ 250/432 R, 432 PD, 435, 250/436

[56] References Cited
PUBLICATIONS

"Development of an On-Line Tritium Monitor with Gamma Ray Rejection and Energy Discrimination", Cox et al., Argonne National Lab publication, Oct. 19, 1981.
"Developments in Tritium Monitoring", McElroy et al., Conf. on Tritium Tech. Apr. 1980.
"HT/HTO MPC Detector Response Under Field Conditions", Hoots et al., Proc. Amer. Nucl. Society Topical Meeting, Apr. 1980.
"A Monitor for the Separate Determination of HT and HTO", McElroy et al., *JEEE Trans. on Nuclear Sci.*, vol. NS-29, No. 1, Feb. 1982.
"HT/HTO MPC Detector Response Under Field Conditions", Hoots et al., *Tritium Proceedings Tritium Tech. in Fission, Fusion and Isotropic Applications*, Apr. 1980, p. 245.

Primary Examiner—Bruce C. Anderson
Attorney, Agent, or Firm—William Lohff; James W. Weinberger

[57] ABSTRACT

Apparatus and method for selective measurement of tritium oxide in an environment which may include other radioactive components and gamma radiation, the measurement including the selective separation of tritium oxide from a sample gas through a membrane into a counting gas, the generation of electrical pulses individually representative by rise times of tritium oxide and other radioactivity in the counting gas, separation of the pulses by rise times, and counting of those pulses representative of tritium oxide. The invention further includes the separate measurement of any tritium in the sample gas by oxidizing the tritium to tritium oxide and carrying out a second separation and analysis procedure as described above.

12 Claims, 3 Drawing Figures

TRITIUM MONITOR WITH IMPROVED GAMMA-RAY DISCRIMINATION

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

This invention relates to the measurement of radioactive tritium oxide in a sample gas and more particularly to a selective measurement of tritium oxide in a sample gas and in an environment which may contain gamma radiation. The invention further relates to a selective separation of tritium oxide from the sample gas prior to the measurement.

In the operation of commercial nuclear power generating facilities, radioactive tritium is produced. The resultant product is a mixture of the elemental gaseous form HT and the oxidized counterpart to water HTO. In general, tritium and tritium oxide have been detected and measured by the use of ion chambers. In these instruments, measuring currents are produced which represent a sum of the various radioactive components in the sample. If other radioactive components in addition to tritium or tritium oxide are in the sample, the measurements include a degree of error.

In addition, some authorities have recommended that tritium oxide be measured apart from tritium. Tritium oxide appears to be more readily absorbed by the human body than tritium. Accordingly, separate measurements of tritium oxide at low levels would provide information useful in reducing the danger of exposure to tritium oxide.

One object of the invention is the measurement of tritium oxide in a gas. A second object of the invention is the separate measurement of tritium in a gas. A third object of the invention is the selective measurement of tritium oxide and/or tritium in a gas containing other forms of radiation. Another object of the invention is the selective measurement of tritium oxide and/or tritium at low levels. A further object of the invention is the isolation of tritium oxide from the sample gas before the measurement operations.

Additional objects, advantages and novel features of the invention will be set forth in part in the description which follows, and in part will become apparent to those skilled in the art upon examination of the following or may be learned by practice of the invention.

SUMMARY OF THE INVENTION

Briefly, the invention is directed to apparatus and a method for providing a selective measurement of any tritium oxide in a radioactive sample gas which may contain tritium and be contaminated with other radioactive components such as $^{41}A$ which provides beta decay. Further the environment for the measurement may contain gamma radiation. In the apparatus, a tritium oxide separation means is provided for the selective separation of tritium oxide from a sample gas to a counting gas, a pulse generating means radioactively coupled to the counting gas and responsive to any radioactivity therein generates a series of electrical pulses, a rise time discrimination means separates pulses representative of tritium oxide from other pulses based on rise times of the pulses, and those pulses with rise times representative of the tritium oxide are counted. Advantageously, any tritium in the sample gas is separately oxidized to tritium oxide in a second stage and a similar analytical procedure is carried out to determine the tritium in the sample gas.

DETAILED DESCRIPTION OF THE PREFERRED EMBODIMENT

The invention as described herein is useful for selectively measuring tritium oxide and/or tritium in gas samples from nuclear power generating facilities, experimental fission and fusion facilities and the like. As is known, tritium oxide and tritium result from the operation of these facilities and have been previously measured by prior art techniques which have been primarily associated with ion chambers. In general, gas samples are obtained from a variety of areas such as the stack areas, control rooms, and disassembly rooms. While tritium oxide and tritium may range down to zero concentrations, the concentrations of primary interest in these samples may range from 0.02 to 500 microcurie/$m^3$.

In the invention, a tritium oxide separation means such as a membrane barrier is interposed between a gas sample means and a counting gas means for the selective separation of tritium oxide from the sample gas to the counting gas. A pulse generating means such as a sensing wire of a proportional counting system is radioactively coupled to the counting gas means and by being responsive to any radioactivity therein generates a series of electrical pulses individually represented by rise times of any tritium oxide, other contaminating radioactive components in the sample gas, or gamma radiation. A rise time discrimination means separates pulses representative of tritium oxide from other pulses based on rise times of the pulses, and those pulses with rise times representative of the tritium oxide are counted. Advantageously, any tritium in the sample gas is separately oxidized to tritium oxide in a second stage and analyzed by similar techniques.

By use of the invention, the tritium oxide content of a gas sample may be selectively measured apart from gamma radiation, and other contaminating radioactive components including various isotopes such as $^{41}A$ providing beta decay and background radiation. Further, by oxidizing any tritium in the gas sample after removal of tritium oxide, a separate selective measurement of tritium may be carried out. By converting the tritium to tritium oxide, each stage of separation of tritium oxide and subsequent measurement may be carried out using similar techniques. This also permits the use of a single pulse height discrimination and rise time discrimination system to be utilized for both stages.

Figure 1:
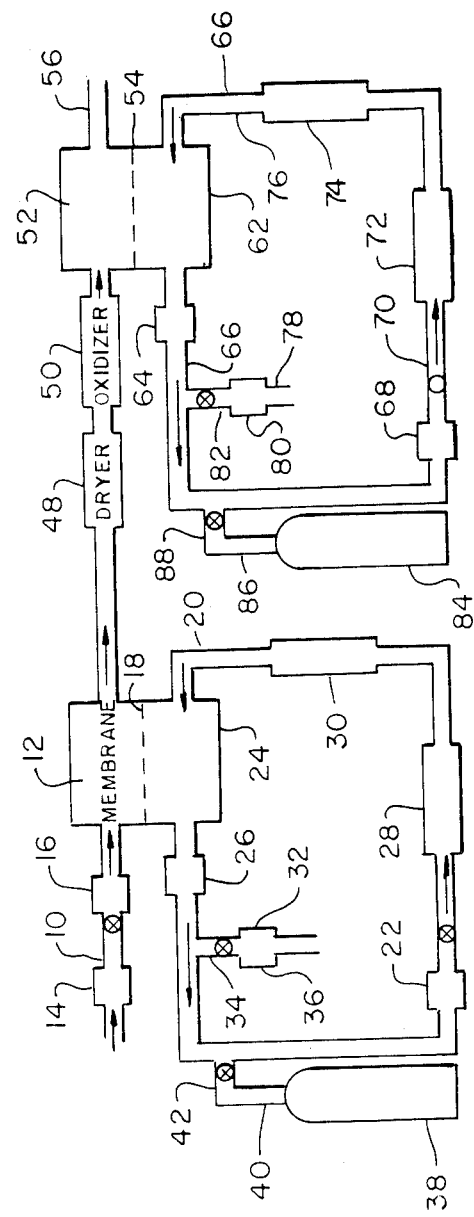
FIG. 1 is a flow diagram of a portion of one embodiment of the invention.
Figure 2:
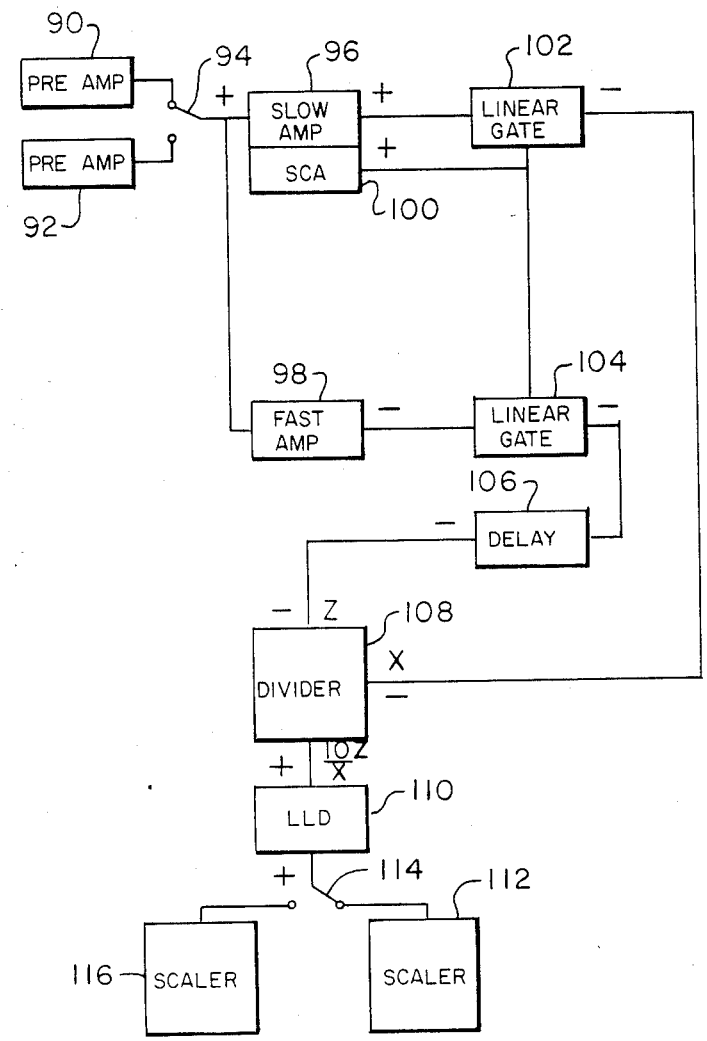
FIG. 2 is a block diagram of electronic equipment also representing a portion of one embodiment of the invention.

As illustrated in the embodiment of FIGS. 1 and 2, apparatus is provided for selectively measuring any tritium oxide in a radioactive sample gas which may contain both radioactive components such as $^{41}A$ and nonradioactive components such as oxygen and nitrogen. The radioactive components other than tritium will usually include at least one material emitting beta radiation either as a major component or in minor amounts providing background radiation.

Since the gas sample usually contains components such as oxygen which may interfere with the subsequent generation and counting of electrical pulses representative of tritium oxide and other forms of radiation, a counting gas such as a mixture of carbon dioxide and argon is provided as a separate system. Any tritium oxide is transferred from the gas sample to the counting gas through a membrane barrier selective for tritium oxide which is interposed between the two gas systems for separation and transfer purposes. A portion of the contaminating radioactive components may also be transferred across the membrane so that the radioactive counting gas contains radiation in addition to any tritium oxide. At this stage, little, if any, tritium is transferred. Usually, some gamma radiation is present in the environment causing ionization of the counting gas in addition to that due to tritium oxide.

At least a portion of the tritium oxide is transferred across the membrane. In general, the transfer efficiency across the membrane will depend on the various flow rates set up, but typically will be in the range from 50% to 100% with a more exact value determined by a few test runs. The discrimination ratio between HTO and HT is ideally 5000 to 1, but under typical operation conditions it is closer to 1000 to 1.

Measurement of the tritium oxide is carried out by pulse generating means which is coupled to the counting gas system and responsive to the radioactive components of the counting gas. The series of generated pulses are individually representative by rise times of ionizing events due to any tritium oxide other contaminating radioactive components in the sample gas and gamma radiation.

Figure 3:
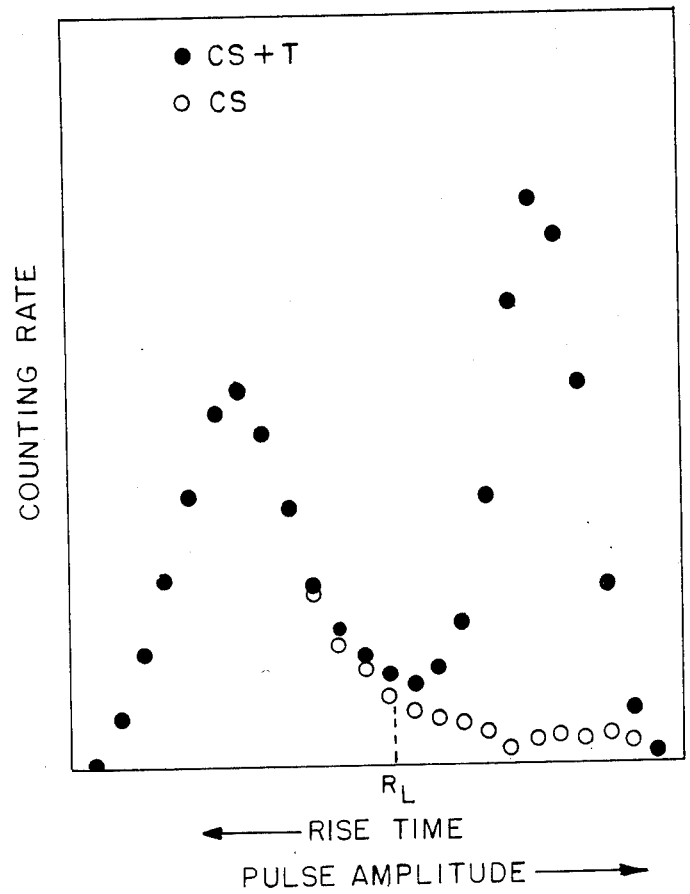
FIG. 3 is a graph illustrating the rise time distribution for pulses representative of tritium oxide and those representative of gamma radiation.

Rise time discrimination means are provided for separating pulses with rise times below a general value from pulses with higher rise times. The pulses with the faster rise times represent the tritium oxide content of the gas sample and are then counted. The rise time value for the separation is selected as a general upper limit for tritium oxide. As illustrated in FIG. 3, pulses representative of gamma radiation have longer rise times and are distinguishable from those representative of tritium oxide. Also, pulses resulting other than from beta decay components tend to have longer rise times and are distinguishable. Advantageously, pulse height discrimination means are provided for separating pulses lower than about 20 keV from those with higher energies which do not represent tritium oxide. In this manner, the tritium oxide content of the gas sample may be selectively measured from a sample containing other forms of radiation and wherein the measuring system is exposed to gamma radiation.

In the continuous measurement of tritium oxide in a gas sample, means are provided for feeding a sample gas to the membrane and means are provided for circulating the counting gas past the membrane and pulse generating means. Advantageously, the tritium oxide is removed after detection and measurement by a drier or other means. Also, a portion of the counting gas is continuously withdrawn and replaced to maintain the desired purity.

Means are also provided for the selective measurement of any tritium in the gas sample by providing an oxidizing environment for the tritium oxide depleted gas sample which oxidizes any tritium in the sample to tritium oxide and forms a second gas sample. A second tritium oxide recovery and measurement system is then utilized to provide a separate selective measurement of the tritium oxide in the second gas sample and therefore tritium in the first sample.

Accordingly, the inventive apparatus provides a selective measurement of any tritium oxide in a radioactive sample gas which may contain tritium and be contaminated with at least one other radioactive component and wherein the apparatus may be exposed to gamma radiation, comprising first sample gas means including means for providing a sample gas, first counting gas means including a counting gas, first tritium oxide separation means interposed between the sample gas means and the counting gas means for selectively separating at least a portion of any tritium oxide from the sample gas into the counting gas, pulse generating means radioactively coupled to the counting gas means and responsive to radioactivity therein for generating a series of electrical pulses including pulses having energies below about 20 keV and individually representative by rise time of any tritium oxide, gamma radiation, or the contaminating radioactive component, rise time discrimination means for separating pulses having energies below about 20 keV and with rise times below a value representing a general upper limit for tritium oxide from pulses with rise times above the limiting value, and means for counting the pulses with rise times below the limiting value as representative of the tritium oxide content of the sample gas.

Advantageously, the apparatus includes a second sample gas means coupled to the first sample gas means for receiving the tritium oxide depleted gas, the second sample gas means including oxidizing means for oxidizing any tritium in the tritium oxide depleted gas to tritium oxide, a second counting gas means, and a second tritium oxide separation means interposed between the second sample gas means and the second counting gas means, the pulse generating means being radioactively coupled to the second gas sample means.

Preferably, the apparatus includes a first sample gas means, a first loop means including a loop containing a first counting gas, a first tritium oxide separating means coupled to the first sample gas means for separating at least a portion of any tritium oxide from the first sample gas into the counting gas, and means for circulating the counting gas within the loop, a second sample gas means coupled to the first gas sample means and including oxidizing means for oxidizing any tritium in the first sample gas to tritium oxide to form a second sample gas, a second loop means including a loop containing a second counting gas, a second tritium oxide separating means coupled to the second sample gas means for separating at least a portion of any tritium oxide from the second sample gas into the second counting gas, and means for circulating the second counting gas within the loop, a pulse generating means coupled to at least one loop means and responsive to the radioactivity in the counting gas therein for generating a series of electrical pulses including pulses in an energy range below about 20 keV and individually representative by rise time of any tritium oxide, gamma radiation, or said contaminating radioactive component, pulse height discrimination means for separating pulses having energies below about 20 keV, and with rise times being below a value representing a general upper limit for tritium oxide from pulses with rise times above said value, and means for counting the pulses with rise times below said value as representative of the tritium oxide content of the sample gas.

FIGS. 1 and 2 illustrate one embodiment of the invention. As illustrated, a gas sample means illustrated by gas inlet 10 provides a means of feeding a gas sample into chamber 12. A pump 14 and flow meter 16 serve to provide a means of regulating the flow rate of gas to chamber 12. A tritium oxide separation means is provided by membrane 18 adjacent to chamber 12 by which tritium oxide in the gas sample selectively is extracted across the membrane. Membrane 18 further serves to isolate a counting gas means as illustrated by first loop 20 from the gas sample system. A suitable membrane may be formed from a perfluorosulfonic acid sold by DuPont under the trademark Nafion. In loop 20, a counting gas such as argon and carbon dioxide in a ratio of about 5:1 is circulated by means of pump 22 into the chamber 24 to receive tritium oxide being transferred across membrane 18. The counter gas is further circulated in loop 20 through flow meter 26, pump 22, and through chamber 28 which provides a means of coupling the loop to a pulse generating and counting means which may be represented by a proportional counting system. After radiation in the counting gas has been measured, the counting gas is fed to drier 30 which removes any tritium oxide in the sample. As a means of providing the desired purity of the counting gas, vent 32 is provided to vent a portion of the counting gas through valve 34 and flow meter 36 with that portion being made up from source 38 which is fed into the loop by means of piping 40 and valve 42.

Adjacent to the first tritium oxide separation and measurement system is a second tritium oxide separation and measurement system which is used in conjunction with a drier and oxidizer to provide a second gas sample with tritium oxide representing any tritium in the initial gas sample. In the second gas sample means illustrated by drier 48, oxidizer 50 and chamber 52, any tritium in the tritium-oxide depleted first gas sample is converted to tritium oxide for separation and measurement in the second system. Drier 48 serves to remove any remaining tritium oxide from the first sample gas while oxidizer 50 provides a source of an oxidizing catalyst such as palladium which together with oxygen in the gas sample serves to oxidize any tritium in the sample to tritium oxide. Chamber 52 provides a contact with membrane 54 which serves as a barrier for components in the second gas sample other than tritium oxide. The tritium oxide depleted second sample is then exhausted from the system through exhaust 56. In a similar manner to that of the first system, membrane 54 separates the second gas sample means from a second counting gas means as illustrated by the second loop 60 with chamber 62 flow meter 64, line 66, pump 68, valve 70, chamber 72, drier 74 and line 76. In addition, vent 78 with flow meter 80 and valve 82 together with makeup source 84, line 86 and valve 88 provides means of replenishing or of maintaining the purity of the counting gas. In each of the two separation systems illustrated in FIG. 1, means are provided to generate a series of pulses individually representative of any tritium oxide and gamma radiation in the counting gas.

FIG. 2 represents a block diagram of a remaining system by which the pulses are amplified separated according to pulse height, and separated according to rise time, with those pulses identified with tritium oxide being counted. Since each of the tritium oxide separation systems provide a similar counting gas and similar pulse generating system, the pulses from each system may be processed by a single combination of electronic equipment. In FIG. 2, preamp 90 and preamp 92 receive signals from the pulse generating means of the first and second systems respectively and by means of switch 94 the pulses from one system are processed followed by the pulses from the second system. The pulses from preamp 90 are transmitted to slow amplifier 96 and fast amplifier 98. Slow amplifier 96 has a time constant longer than the rise time of the pulses from the preamplifier so that the output pulse amplitude represents the full energy of the ionization event. Fast amplifier 98 is a faster amplifier with a time constant which is shorter than the rise time of the gamma ray induced events. The output pulse amplitude from the fast amplifier 98 then depends on both the full energy and rise time of the ionizing event. In order to eliminate the energy dependence of the pulse amplitudes the two pulses are stretched in linear gates 102 and 104 and sent to an analog divider 108, where the fast pulse is divided by the slow pulse. The divider output pulse amplitude is then dependent only on the rise time of the event. Advantageously, pulses for subsequent analysis are limited to energies below about 20 keV. Therefore, signal channel analyzer "SCA" 100 serves to provide a pulse height discriminating function to open or close linear gates 102 and 104 to limit the pulses to those below about 20 keV. Delay 106 is provided so that the same pulses arrive at the same time at divider 108 which provides a signal in which the energy component is cancelled leaving a rise time component by which the pulses representative of the tritium oxide can be separated from pulses representative of gamma radiation and other forms of radiation. LLD 110 represents a lower level discriminator which rejects signals with rise times above a general value and feeds the remaining pulses to scaler 112 which counts those pulses with rise times representative of tritium oxide. In a similar manner, the equipment may be utilized through switches 94 and 114 together with scaler 116 and preamp 92 to process the pulses generated from pulse generating means coupled to chamber 72 in the second loop means.

As illustrated in FIG. 3, rise times of tritium (or tritium oxide) differ from those for gamma radiation (or beta decay) and may be used to distinguish between therm. In FIG. 3, the "y" axis is counts/min. while the "x" axis is rise time with the zero value at the right. The reverse of rise time is pulse amplitude in that the rise time discriminating system provides data where differing rise times are represented by increasing pulse amplitude. On the x axis the sumbol "$R_L$" is intended to represent the value which represents a general upper limit for the tritium curve which is to the right of $R_L$. The curve to the left of $R_L$ represents gamma radiation. While the data for FIG. 3 represent the experimental results, they show that rise times may be used for separation.

To provide the data of FIG. 3, a cesium gamma ray source was brought close to the proportional counter to provide a gamma ray background equivalent to approximately one mR/HR. The horizontal axis represents the rise time of the pulses, and the vertical axis represents the counting rate. The open circles are data taken only with the gamma ray source present. Since gamma ray events produce pulses with long rise times, the data forms a peak on the left hand side (long rise time) of the graph. The closed circles are data taken with some tritium added to the counter gas, thus forming a second peak on the right hand side (short rise time) of the graph.

Accordingly, the invention provides a method of providing a selective measurement of tritium oxide in a gas sample containing radioactive components including at least one source of gamma radiation and nonradioactive components. The method comprises the steps of separating at least a portion of the radioactive components including at least a portion of the tritium oxide from the gas sample and forming a radioactive counting gas, generating from the radioactivity in the counting as a series of electrical pulses, including pulses and an energy range below about 20 keV and individually representative by rise time of any tritium oxide and said source of gamma radiation and the radioactive counting gas, separating by rise time discrimination pulses with rise times below a general value from pulses with rise times above the general value within the energy range below about 20 keV and counting the pulses with rise times below the general value as representative of the tritium oxide content of the gas sample. Advantageously, pulses above 20 keV are separated by pulse-height-discrimination means before the rise time discrimination is carried out. Further, the method includes the use of a membrane barrier in the separating step to provide a tritium oxide depleted gas sample with the method further including the step of providing an oxidizing environment for the depleted gas sample to oxidize any tritium to tritium oxide followed by carrying out a second sequence of the steps described above.

By this invention, apparatus and a method are provided by which tritium oxide may be selectively measured in a radioactive gas contaminated with one or more sources of radiation.

The embodiments of the invention in which an exclusive property or privilege is claimed are defined as follows:

1. Apparatus for providing a selective measurement of any tritium oxide in a radioactive sample gas which may contain tritium and be contaminated with at least one other radioactive component and wherein said apparatus may be exposed to gamma radiation, comprising first sample gas means including means for providing a sample gas, first counting gas means including a counting gas, first tritium oxide separation means interposed between the sample gas means and the counting gas means for selectively separating at least a portion of any tritium oxide from the sample gas into the counting gas, pulse generating means radioactively coupled to the counting gas means and responsive to radioactivity therein for generating a series of electrical pulses including pulses having energies below about 20 keV and individually representative by the rise time of any tritium oxide, gamma radiation, or said contaminating radioactive component, rise time discrimination means for separating pulses having energies below about 20 keV and with rise times below a value representing a general upper limit for tritium oxide from pulses with rise times above said value, and means for counting the pulses with rise times below said value as representative of the tritium oxide content of the sample gas.

2. The apparatus of claim 1 which includes pulse height discrimination means prior to the rise time discrimination means for separating pulses with energies below about 20 keV from pulses with energies above about 20 keV.

3. The apparatus of claim 2 wherein the separation means includes a membrane barrier.

4. The apparatus of claim 1 wherein the separation of tritium oxide results in a tritium oxide depleted gas and wherein the apparatus includes a second sample gas means coupled to the first sample gas means for receiving the tritium oxide depleted gas, the second source gas means including oxidizing means for oxidizing any tritium in the tritium oxide depleted gas to tritium oxide, a second counting gas means, and a second tritium oxide separation means interposed between the second sample gas means and the second counting gas means, the pulse generating means being radioactively coupled to the second gas sample means.

5. Apparatus for providing a selective measurement of any tritium oxide in a radioactive sample gas which may contain tritium and be contaminated with at least one other radioactive component wherein said apparatus may be exposed to gamma radiation, comprising a first sample gas means, a first loop means including a loop containing a first counting gas, a first tritium oxide separating means coupled to the first sample gas means for separating at least a portion of any tritium oxide from the first sample gas into the counting gas, and means for circulating the counting gas within the loop, a second sample gas means coupled to the first gas sample means and including oxidizing means for oxidizing any tritium in the first sample gas to tritium oxide to form a second sample gas, a second loop means including a loop containing a second counting gas, a second tritium oxide separating means coupled to the second sample gas means for separating at least a portion of any tritium oxide from the second sample gas into the second counting gas, and means for circulating the second counting gas within the loop, a pulse generating means coupled to at least one loop means and responsive to the radioactivity in the counting gas therein for generating a series of electrical pulses including pulses in an energy range below about 20 keV and individually representative by rise time of any tritium oxide, gamma radiation, or said contaminating radioactive component, rise time discrimination means for separating pulses having energies below about 20 keV and with rise times being below a value representing a general upper limit for tritium oxide from pulses with rise times above said value, and means for counting the pulses with rise times below said value as representative of the tritium oxide content of the sample gas.

6. The apparatus of claim 5 which includes pulse height discrimination means for separating pulses with energies below about 20 keV from pulses with energies above 20 keV.

7. The apparatus of claim 6 wherein each separation means includes a membrane barrier selective for tritium oxide.

8. The apparatus of claim 7 wherein said first and second loop means each includes means for removing tritium oxide from the counting gas after the pulse generating means has responded to the radioactivity of said tritium oxide.

9. The apparatus of claim 8 wherein said first and second loop means each includes means for removing and replenishing at least a portion of said counting gas.

10. A method of providing a selective measurement of any tritium oxide in a radioactive sample gas which may contain tritium and be contaminated with at least one other radioactive component and in an environment where a source of gamma radiation may be present, said method comprising the steps of:

selectively separating at least a portion of the radioactivity of said sample gas including at least a portion of any tritium oxide from the sample gas to a counting gas, generating from the radioactivity in said counting gas a series of electrical pulses including pulses in an energy range below about 20 keV and individually representative by rise time of any tritium oxide and said gamma radiation, and said comtaminating radioactive component, separating pulses having energies below about 20 keV and with rise times below a value representing a general upper limit for tritium oxide from pulses with rise times above said value, and counting the pulses with rise times below said value as representative of the tritium oxide conent of the sample gas.

11. The method of claim 10 which includes prior to the rise time separation, the step of separating pulses with energies below about 20 keV from pulses with energies above about 20 keV.

12. The method of claim 11 wherein said selective separation provides a tritium oxide depleted sample gas and said method includes oxidizing any tritium in said depleted gas sample to form a second sample gas, and carrying out said selective separation, pulse generation, separation by rise time and counting steps for said second sample gas.

* * * * *